United States Patent
Nuida et al.

(10) Patent No.: US 11,905,388 B2
(45) Date of Patent: Feb. 20, 2024

(54) RESIN COMPOSITION, METHOD FOR FORMING CURED PRODUCT, AND CURED PRODUCT

(71) Applicant: ADEKA CORPORATION, Tokyo (JP)

(72) Inventors: Yusuke Nuida, Tokyo (JP); Hitoshi Hosokawa, Tokyo (JP); Hiroshi Morita, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 17/632,685

(22) PCT Filed: Aug. 11, 2020

(86) PCT No.: PCT/JP2020/030596
§ 371 (c)(1),
(2) Date: Feb. 3, 2022

(87) PCT Pub. No.: WO2021/039380
PCT Pub. Date: Mar. 4, 2021

(65) Prior Publication Data
US 2022/0282059 A1      Sep. 8, 2022

(30) Foreign Application Priority Data

Aug. 23, 2019   (JP) .................................. 2019-152675

(51) Int. Cl.
| | | |
|---|---|---|
| C08K 3/08 | (2006.01) | |
| C08G 59/14 | (2006.01) | |
| C08G 59/30 | (2006.01) | |
| C08G 59/32 | (2006.01) | |
| C08G 59/62 | (2006.01) | |
| C08G 59/68 | (2006.01) | |
| C08L 63/00 | (2006.01) | |
| C08L 101/00 | (2006.01) | |

(52) U.S. Cl.
CPC ............ *C08K 3/08* (2013.01); *C08G 59/1488* (2013.01)

(58) Field of Classification Search
None
See application file for complete search history.

(56) References Cited

U.S. PATENT DOCUMENTS 6,080,336 A * 6/2000 Suehiro .................. H05K 1/095
174/265
2018/0352659 A1 * 12/2018 Hayashi ............... H05K 3/0064

FOREIGN PATENT DOCUMENTS

| JP | 09-012937 | | 1/1997 |
|---|---|---|---|
| JP | 2013-115004 | | 6/2013 |
| JP | 2017-110183 | | 6/2017 |
| JP | 2018080221 A | * | 5/2018 |
| JP | 2018-092864 | | 6/2018 |
| JP | 2018-181558 | | 11/2018 |
| JP | 2019-073622 | | 5/2019 |

OTHER PUBLICATIONS

International Search Report, issued in the corresponding PCT application No. PCT/JP2020/030596, dated Oct. 27, 2020, 5 pages.

* cited by examiner

*Primary Examiner* — Randy P Gulakowski
*Assistant Examiner* — Ha S Nguyen
(74) *Attorney, Agent, or Firm* — Hamre, Schumann, Mueller & Larson, P.C.

(57) ABSTRACT

The present invention provides a resin composition that contains copper particles and a particular resin and that is capable of producing a cured product having a low volume resistance value, and a cured product obtained by curing the resin composition. The resin composition contains (A) copper particles having an average particle diameter of 0.1 to 20 µm, (B) a phosphoric acid-modified epoxy resin obtained by reacting a phosphoric acid (b1) with an epoxy compound (b2), and (C) a curing agent, wherein the content of the component (B) and the content of the component (C), based on 100 parts by mass of the total amount of the components (A) to (C), are 0.1 to 30 parts by mass and 0.1 to 5 parts by mass, respectively. Further, the cured product is obtained by curing the resin composition.

9 Claims, No Drawings

RESIN COMPOSITION, METHOD FOR FORMING CURED PRODUCT, AND CURED PRODUCT

TECHNICAL FIELD

The present invention relates to a resin composition containing copper particles and a particular resin, a method for forming a cured product of this resin composition, and a cured product.

BACKGROUND ART

A resin composition containing an electrically conductive metal is used as one of materials for forming circuit wiring, a touch panel, a solar battery, a sensor, and the like. Currently, copper particles, the production costs of which are low, in particular have been attracting attention as an electrically conductive metal, and various types of resin compositions containing copper particles have been studied.

For example, Patent Literature 1 discloses an electrically conductive copper paste composition containing a copper powder, a phenol resin, an imidazole compound, a polyhydric phenol monomer, and a reactive rubber elastomer. Moreover, Patent Literature 2 discloses an aqueous copper paste material containing a flake-like copper powder, an electrolytic spherical copper powder, a reducing agent, and an aqueous resin. Further, Patent Literature 3 discloses a copper paste composition containing copper particles, a resol type phenol resin, and a vinylphenol-based polymer. Furthermore, Patent Literature 4 discloses an electrically conductive copper paste containing copper particles, a resol type phenol resin, an epoxy resin, and an organic acid.

CITATION LIST

Patent Literature

Patent Literature 1: Japanese Patent Laid-Open No. 9-12937
Patent Literature 2: Japanese Patent Laid-Open No. 2013-115004
Patent Literature 3: Japanese Patent Laid-Open No. 2018-92864
Patent Literature 4: Japanese Patent Laid-Open No. 2018-181558

SUMMARY OF INVENTION

Technical Problem

However, a cured product obtained by curing a coating film formed using a resin composition or the like as disclosed in Patent Literatures 1 to 4 has had a problem that the volume resistance value is high, and the electric conductivity is likely to lower.

Accordingly, the present invention has been completed in order to solve the above-described problems, and an object of the present invention is to provide a resin composition that contains copper particles and a particular resin and that is capable of producing a cured product having a low volume resistance value. The other objects of the present invention are to provide a method for forming a cured product using the resin composition and to provide a cured product obtained by curing the resin composition.

Solution to Problem

The present inventors have conducted diligent studies for the purpose of solving the problems to find that a resin composition containing particular components can solve the problems and have thereby completed the present invention.

That is, according to the present invention, a resin composition containing: (A) copper particles having an average particle diameter of 0.1 to 20 μm; (B) a phosphoric acid-modified epoxy resin obtained by reacting a phosphoric acid (b1) with an epoxy compound (b2); and (C) a curing agent, wherein a content of the component (B) and a content of the component (C), based on 100 parts by mass of the total amount of components (A) to (C), are 0.1 to 30 parts by mass and 0.1 to 5 parts by mass, respectively, is provided.

Further, according to the present invention, a method for forming a cured product, including: an application step of applying the resin composition on a substrate; and a curing step of curing the resin composition by heating the substrate on which the resin composition has been applied is provided.

Furthermore, according to the present invention, a cured product obtained by curing the resin composition is provided.

Advantageous Effects of Invention

According to the present invention, a resin composition that contains copper particles and a particular resin and that is capable of producing a cured product having a low volume resistance value can be provided. Further, according to the present invention, a method for forming a cured product using the resin composition and a cured product obtained by curing the resin composition can be provided.

DESCRIPTION OF EMBODIMENTS

Hereinafter, embodiments of the present invention will be described in detail. A resin composition of one embodiment of the present invention is a resin composition containing: (A) copper particles (hereinafter, also referred to as "component (A)") having an average particle diameter of 0.1 to 20 μm; (B) a phosphoric acid-modified epoxy resin (hereinafter, also referred to as "component (B)") obtained by reacting a phosphoric acid (b1) with an epoxy compound (b2); and (C) a curing agent (hereinafter, also referred to as "component (C)") as essential components.

The component (A) refers to copper particles having an average particle diameter of 0.1 to 20 μm. The type of the copper particles is not particularly limited, and generally known copper particles can be used. In addition, the average particle diameter of the copper particles is 0.1 to 20 μm, preferably 0.5 to 10 μm, and more preferably 1.0 to 5 μm. Note that the average particle diameter of the copper particles refers to a cumulative 50% particle diameter ($D_{50}$) in a particle size distribution on a volume basis, measured and calculated using a particle diameter distribution analyzer by a laser light diffraction method. The shape of the copper particles is not particularly limited, and one type of, or two or more types of copper particles, such as granular, needle-like, and flake-like copper particles, can be used. Among others, granular copper particles are preferably contained, and both of granular copper particles and flake-like copper particles are more preferably contained, because the electric conductivity of a resultant cured product is high. Note that in the present specification, both of scale-like copper particles and plate-like copper particles are included in the flake-like copper particles. The content of the granular copper particles based on 100 parts by mass of the total amount of the component (A) is preferably 70 to 100 parts by mass, and more preferably 75 to 95 parts by mass. In addition, the content of the flake-like copper particles based on 100 parts by mass of the total amount of the component (A) is preferably 0 to 30 parts by mass, and more preferably 5 to 25 parts by mass.

When the copper particles are already oxidized by air or the like, the copper particles are desirably washed in advance using an aqueous solution obtained by dissolving an inorganic acid or an organic acid. For example, an aqueous solution obtained by dissolving sulfuric acid is preferably used as the aqueous solution for washing the copper particles.

The component (B) refers to a phosphoric acid-modified epoxy resin. This phosphoric acid-modified epoxy resin (B) is a reaction product of a phosphoric acid (b1) and an epoxy compound (b2). The phosphoric acid (b1) is not particularly limited as long as it is a compound having a phosphate bond in the molecule thereof. Examples of such a phosphoric acid (b1) include phosphoric acid (orthophosphoric acid: $H_3PO_4$), phosphorus acid ($H_3PO_3$), hypophosphorous acid ($H_3PO_2$), phosphonic acid ($H_3PO_3$), diphosphoric acid (pyrophosphoric acid: $H_4P_2O_7$), and polyphosphoric acids, such as triphosphoric acid. Among these, phosphoric acid ($H_3PO_4$) is preferable because the electric conductivity of a resultant cured product is high.

The epoxy compound (b2) is not particularly limited as long as it is a compound having one or more epoxy groups in the molecule thereof. Examples of such an epoxy compound (b2) include: reactive diluents having one epoxy group, such as n-butyl glycidyl ether, $C_{12}$ to $C_{14}$ alkyl glycidyl ethers, aryl glycidyl ethers, 2-ethylhexyl glycidyl ether, styrene oxide, phenyl glycidyl ether, cresyl glycidyl ether, p-sec-butylphenyl glycidyl ether, t-butylphenyl glycidyl esters, glycidyl methacrylate, and tertiary carboxylic acid glycidyl ethers; reactive diluents having two epoxy groups, such as ethylene glycol diglycidyl ether, propylene glycol diglycidyl ether, butanediol diglycidyl ether, 1,6-hexanediol diglycidyl ether, and neopentyl glycol diglycidyl ether; reactive diluents having three epoxy groups, such as trimethylolpropane triglycidyl ether and glycerin triglycidyl ether; bisphenol type epoxy resins, such as bisphenol A type epoxy resins and bisphenol F type epoxy resins; biphenyl type epoxy resins, such as biphenyl type epoxy resins and tetramethylbiphenyl type epoxy resins; dicyclopentadiene type epoxy resins; naphthalene type epoxy resins; alicyclic epoxy resins obtained from cyclohexane dimethanol, hydrogenated bisphenol A, and the like; novolac type epoxy resins, such as phenol novolac type epoxy resins, cresol novolac type epoxy resins, bisphenol A novolac type epoxy resins, epoxidized compounds which are condensed products of phenols and aromatic aldehydes having a phenolic hydroxy group, and biphenyl novolac type epoxy resins; triphenylmethane type epoxy resins; tetraphenylethane type epoxy resins; dicyclopentadiene-phenol addition reaction type epoxy resins; and phenol aralkyl type epoxy resins. These epoxy compounds (b2) may be used singly, or two or more of these epoxy compounds (b2) may be used together.

Among the specific examples of the epoxy compounds (b2), a bisphenol type epoxy resin, a biphenyl type epoxy resin, or an alicyclic epoxy resin, which is easily available and inexpensive and gives satisfactory physical properties to cured products, is preferably used, and a bisphenol type epoxy resin is more preferably used.

The phosphoric acid-modified epoxy resin (B) is a phosphorus atom-containing epoxy compound having an epoxy group at an end thereof. The phosphoric acid-modified epoxy resin can be obtained by reacting the phosphoric acid (b1) with the epoxy compound (b2). The phosphoric acid-modified epoxy resin (B) can preferably be obtained by reacting the phosphoric acid (b1) with the epoxy compound (b2) at a temperature of 20 to 100° C. The phosphoric acid (b1) and the epoxy compound (b2) may be reacted in the presence of a solvent, and then the solvent may be removed. The phosphoric acid (b1) and the epoxy compound (b2) are preferably reacted in such a way that the number of epoxy groups in the epoxy compound (b2) is larger than the number of active hydrogen in the phosphoric acid (b1). When a plurality of epoxy compounds (b2) is used, the phosphoric acid-modified epoxy resin (B) is preferably synthesized in the manner as described below. Firstly, the phosphoric acid (b1) and at least one of the epoxy compounds (b2) are reacted under a condition in which the number of active hydrogen in the phosphoric acid (b1) is larger than the number of epoxy groups in the epoxy compound (b2), thereby synthesizing a phosphorus-modified epoxy compound (intermediate) in which active hydrogen derived from the phosphoric acid (b1) is left. Subsequently, the synthesized phosphorus-modified epoxy compound (intermediate) is reacted with the other at least one epoxy compound (b2), and thus a phosphorus atom-containing epoxy compound having an epoxy group at an end thereof can be obtained finally as the component (B).

Examples of the solvent which is used when the phosphoric acid (b1) and the epoxy compound (b2) are reacted include: ketones, such as methyl ethyl ketone, methyl amyl ketone, diethyl ketone, acetone, methyl isopropyl ketone, propylene glycol monomethyl ether acetate, and cyclohexanone; ethers, such as tetrahydrofuran, 1,2-dimethoxyethane, 1,2-diethoxyethane, and propylene glycol monomethyl ether; esters, such as ethyl acetate and n-butyl acetate; aromatic hydrocarbons, such as benzene, toluene, and xylene; halogenated aliphatic hydrocarbons, such as carbon tetrachloride, chloroform, trichloroethylene, and methylene chloride; and halogenated aromatic hydrocarbons, such as chlorobenzene. Among these, the solvent is preferably a ketone, and more preferably methyl ethyl ketone or methyl isopropyl ketone, from the standpoint that removal after the reaction is easy, or from other standpoints.

It is difficult to define the whole structure of the bisphenol type epoxy resin and the novolac type epoxy resin, which can be used as the epoxy compound (b2), using a chemical formula or a general formula because the repeating units are not single. Further, there is a possibility that a side reaction, in which a hydroxy group produced from the epoxy compound (b2) in the process of synthesizing the phosphoric acid-modified epoxy resin (B) reacts with another epoxy group in the epoxy compound (b2), occurs, and therefore the structure of the phosphoric acid-modified epoxy resin (B) can be complicated. Accordingly, the structure of the phosphoric acid-modified epoxy resin (B) is not uniform and is rich in variety, and therefore it is substantially impossible to define the structure by consistent chemical bonds or a general formula. From those described above, there is no choice but to define the phosphoric acid-modified epoxy resin (B) by the method for producing it.

In the process of producing the phosphoric acid-modified epoxy resin (B), the compound which is used as a modifying agent for the epoxy compound (b2), which is a starting material, preferably consists of phosphoric acid (b1).

The content of the component (B) in the resin composition is 0.1 to 30 parts by mass based on 100 parts by mass of the total amount of the components (A) to (C). The content of the component (B) in the resin composition is preferably 1 to 20 parts by mass, and more preferably 5 to 15 parts by mass, based on 100 parts by mass of the total amount of the components (A) to (C) because the electric conductivity of a resultant cured product is enhanced more. When the content of the component (B) is less than 0.1 parts by mass based on 100 parts by mass of the total amount of the components (A) to (C), an effect to be brought about by allowing the resin composition to contain the component (B) is unlikely to be exhibited. On the other hand, even when the content of the component (B) is set in such a way as to exceed 30 parts by mass based on 100 parts by mass of the total amount of the components (A) to (C), the effect to be brought about by allowing the resin composition to contain the component (B) is difficult to enhance.

The component (C) is a curing agent that cures the phosphoric acid-modified epoxy resin (B), which is an epoxy compound. Examples of the curing agent (C) include latent curing agents, acid anhydrides, polyamine compounds, polyphenol compounds, and cationic photo polymerization initiators.

Examples of the latent curing agent include dicyandiamide, hydrazides, imidazole compounds, amine adducts, sulfonium salts, onium salts, ketimines, acid anhydrides, and tertiary amines. These latent curing agents are preferably used because the resin composition in which an additive for forming a cured product is to be contained can be made into a one-pack type curable resin composition which is easy to handle.

Examples of the imidazole compound include various types of imidazoles, such as 2-methylimidazole, 2-phenylimidazole, 2-undecylimidazole, 2-heptadecylimidazole, 2-phenyl-4-methylimidazole, 2-ethyl-4-methylimidazole, 2-phenyl-4-methyl-5-hydroxymethylimidazole, 1-benzyl-2-phenylimidazole, 1-benzyl-2-methylimidazole, 1-cyanoethyl-2-methylimidazole, 1-cyanoethyl-2-phenylimidazole, 1-cyanoethyl-2-undecylimidazole, 2,4-diamino-6(2'-methylimidazole(1'))ethyl-s-triazine, 2,4-diamino-6(2'-undecylimidazole(1'))ethyl-s-triazine, 2,4-diamino-6(2'-ethyl, 4-methylimidazole(1'))ethyl-s-triazine, 2,4-diamino-6(2'-methylimidazole(1'))ethyl-s-triazine/isocyanuric acid adducts, a 2:3 adduct of 2-methylimidazole/isocyanuric acid, 2-phenylimidazole/isocyanuric acid adducts, 2-phenyl-3,5-dihydroxymethylimidazole, 2-phenyl-4-hydroxymethyl-5-methylimidazole, and 1-cyanonethyl-2-phenyl-3,5-dicyanoethoxymethylimidazole; and salts of these various types of imidazoles and polyvalent carboxylic acids, such as phthalic acid, isophthalic acid, terephthalic acid, trimellitic acid, pyromellitic acid, naphthalene dicarboxylic acid, maleic acid, and oxalic acid. Among these, 2-ethyl-4-methylimidazole is preferable in terms of curability and storage stability. Examples of commercially available products include trade names "2P4MHZ-PW," "2P4MHZ," and "2E4MZ" (all manufactured by SHIKOKU CHEMICALS CORPORATION).

Examples of the acid anhydride include phthalic anhydride, trimellitic anhydride, pyromellitic anhydride, tetrahydrophthalic anhydride, hexahydrophthalic anhydride, maleic anhydride, succinic anhydride, and 2,2-bis(3,4-dicarboxyphenyl)-1,1,1,3,3,3-hexafluoropropane dianhydride.

Examples of the polyamine compound include: aliphatic polyamines, such as ethylenediamine, diethylenetriamine, and triethylenetetramine; alicyclic polyamines, such as mencene diamine, isophoronediamine, bis(4-amino-3-methylcyclohexyl)methane, bis(aminomethyl)cyclohexane, and 3,9-bis(3-aminopropyl)2,4,8,10-tetraoxaspiro[5,5]undecane; aliphatic amines having an aromatic ring, such as m-xylenediamine; and aromatic polyamines, such as m-phenylenediamine, 2,2-bis(4-aminophenyl)propane, diaminodiphenylmethane, diamino diphenyl sulfone, α,α-bis(4-aminophenyl)-p-diisopropylbenzene, and 2,2-bis(4-aminophenyl)-1,1,1,3,3,3-hexafluoropropane.

Examples of the polyphenol compound include phenol novolac, o-cresol novolac, t-butylphenol novolac, dicyclopentadiene cresol, terpene diphenol, terpene dicatechol, 1,1,3-tris(3-t-butyl-4-hydroxy-6-methylphenyl)butane, butylidenebis(3-t-butyl-4-hydroxy-6-methylphenyl), and 2,2-bis(4-hydroxyphenyl)-1,1,1,3,3,3-hexafluoropropane.

As the component (C), a latent curing agent is preferably used, and among the latent curing agents, an imidazole compound is more preferably used.

The content of the component (C) in the resin composition is 0.1 to 5 parts by mass based on 100 parts by mass of the total amount of the components (A) to (C). The content of the component (C) in the resin composition is preferably 0.3 to 4 parts by mass, and more preferably 0.5 to 3 parts by mass, based on 100 parts by mass of the total amount of the components (A) to (C). When the content of the component (C) is less than 0.1 parts by mass based on 100 parts by mass of the total amount of the components (A) to (C), the resin composition is difficult to cure. On the other hand, even when the content of the component (C) is set in such a way as to exceed 5 parts by mass based on 100 parts by mass of the total amount of the components (A) to (C), an effect to be brought about by allowing the resin composition to contain the component (C) is difficult to enhance.

The resin composition which is one embodiment of the present invention preferably further contains (D) at least one resin selected from the group consisting of a xylene resin, a phenol resin, and an epoxy resin (excluding the component (B)). By using the component (A), the component (B) and the component (C) together with the component (D) in combination, the resin composition capable of producing a cured product having a lower volume resistance value can be obtained.

As the xylene resin, for example, a resol type xylene resin, an alkylphenol-modified xylene resin, a novolac type xylene resin, a polyol-modified xylene resin, an ethylene oxide-modified xylene resin, or the like can be used. Among the xylene resins, a resol type xylene resin is preferably used. Note that a commercially available product can also be used. Examples of the commercially available product as the xylene resin include resol type xylene resins (such as trade names: PR-1440 and PR-1440M, manufactured by Fudow Company Limited), alkylphenol-modified xylene resins (such as trade names: GHP-150, HP-120, HP-100, HP-210, and HP-70, manufactured by Fudow Company Limited), novolac type xylene resins (such as trade names: NP-100, GP-212, P-100, GP-200, and HP-30, manufactured by Fudow Company Limited), polyol-modified xylene resins (such as trade name: K-100, manufactured by Fudow Company Limited), and ethylene oxide-modified xylene resins (such as trade name: L5, manufactured by Fudow Company Limited).

As the phenol resin, for example, a novolac type phenol resin, a resol type phenol resin, or the like can be used. Among the phenol resins, a resol type phenol resin is preferably used. Note that a commercially available product can also be used. Examples of the commercially available product as the phenol resin include powdery phenol resins (trade names: RESITOP PGA-4528, PGA-2473, PGA-4704, and PGA-4504, manufactured by Gun Ei Chemical Industry Co., Ltd., trade names: SUMILITERESIN PR-UFC-504, PR-EPN, PR-ACS-100, PR-ACS-150, PR-12687, PR-13355, PR-16382, PR-217, PR-310, PR-311, PR-50064, PR-50099, PR-50102, PR-50252, PR-50395, PR-50590, PR-50590B, PR-50699, PR-50869, PR-51316, PR-51326B, PR-51350B, PR-51510, PR-51541B, PR-51794, PR-51820, PR-51939, PR-53153, PR-53364, PR-53497, PR-53724, PR-53769, PR-53804, PR-54364, PR-54458A, PR-54545, PR-55170, PR-8000, PR-FTZ-1, and PR-FTZ-15, manufactured by Sumitomo Bakelite Co., Ltd.), flake-like phenol resins (trade names: SUMILITERESIN PR-12686R, PR-13349, PR-50235A, PR-51363F, PR-51494G, PR-51618G, PR-53194, PR-53195, PR-54869, PR-F-110, PR-F-143, PR-F-151F, PR-F-85G, PR-HF-3, and PR-HF-6, manufactured by Sumitomo Bakelite Co., Ltd.), liquid phenol resins (trade names: SUMILITERESIN PR-50087, PR-50607B, PR-50702, PR-50781, PR-51138C, PR-51206, PR-51663, PR-51947A, PR-53123, PR-53338, PR-53365, PR-53717, PR-54135, PR-54313, PR-54562, PR-55345, PR-940, PR-9400, and PR-967, manufactured by Sumitomo Bakelite Co., Ltd.), resol type liquid phenol resins (trade names: RESITOP PL-4826, PL-2390, PL-4690, PL-3630, PL-4222, PL-4246, PL-2211, PL-3224, PL-4329, and PL-5208, manufactured by Gun Ei Chemical Industry Co., Ltd., trade names: SUMILITERESIN PR-50273, PR-51206, PR-51781, PR-53056, PR-53311, PR-53416, PR-53570, and PR-54387, manufactured by Sumitomo Bakelite Co., Ltd.), fine-grained phenol resins (trade names: BELLPEARL R800, R700, R600, R200, R100, 5830, 5870, 5890, 5895, 5290, and 5190, manufactured by AIR WATER INC.), perfectly spherical phenol resins (trade names: Marilin GU-200, FM-010, FM-150, HF-008, HF-015, HF-075, HF-300, HF-500, and HF-1500, manufactured by Gun Ei Chemical Industry Co., Ltd.), and solid phenol resins (trade names: RESITOP PS-2601, PS-2607, PS-2655, PS-2768, PS-2608, PS-4609, PSM-2222, PSK-2320, and PS-6132, manufactured by Gun Ei Chemical Industry Co., Ltd.).

Examples of the epoxy resin (excluding the component (B)) include the following epoxy resins by trade names: AER-X8501 (manufactured by Asahi Kasei Corp.), R-301 (manufactured by Mitsubishi Chemical Corporation), and YL-980 (manufactured by Mitsubishi Chemical Corporation), which are bisphenol A type epoxy resins; YDF-170 (manufactured by NIPPON STEEL Epoxy Manufacturing Co., Ltd.), YL-983 (manufactured by Mitsubishi Chemical Corporation), and YL-983U (manufactured by Mitsubishi Chemical Corporation), which are bisphenol F type epoxy resins; epoxy resins having a glycidyl group (DENACOL EX-121, DENACOL EX-171, DENACOL EX-192, DENACOL EX-211, DENACOL EX-212, DENACOL EX-313, DENACOL EX-314, DENACOL EX-321, DENACOL EX-411, DENACOL EX-421, DENACOL EX-512, DENACOL EX-521, DENACOL EX-611, DENACOL EX-612, DENACOL EX-614, DENACOL EX-622, DENACOL EX-810, DENACOL EX-811, DENACOL EX-850, DENACOL EX-851, DENACOL EX-821, DENACOL EX-830, DENACOL EX-832, DENACOL EX-841, DENACOL EX-861, DENACOL EX-911, DENACOL EX-941, DENACOL EX-920, DENACOL EX-931, DENACOL EX-145, DENACOL EX-146, DENACOL EX-147, DENACOL EX-201, DENACOL EX-711, DENACOL EX-721, ONCOAT EX-1020, ONCOAT EX-1030, ONCOAT EX-1040, ONCOAT EX-1050, ONCOAT EX-1051, ONCOAT EX-1010, ONCOAT EX-1011, and ONCOAT EX-1012, (manufactured by Nagase Chemtex Corporation); Epolite M-1230, Epolite 40E, Epolite 100E, Epolite 200E, Epolite 400E, Epolite 70P, Epolite 200P, Epolite 400P, Epolite 1500NP, Epolite 1600, Epolite 80MF, and Epolite 100MF (manufactured by Kyoeisha Chemical Co., Ltd.), OGSOL PG-100, OGSOL EG-200, OGSOL EG-210, and OGSOL EG-250 (manufactured by Osaka Gas Chemicals Co., Ltd.), HP4032, HP4032D, and HP4700 (manufactured by DIC Corporation), ESN-475V (manufactured by NIPPON STEEL Chemical & Material CO., LTD.); 152, 154, 157S70, and YX8800 (manufactured by Mitsubishi Chemical Corporation), ADEKA GLYCIROL ED-503, ADEKA GLYCIROL ED-503G, ADEKA GLYCIROL ED-506, ADEKA GLYCIROL ED-523T, ADEKA RESIN EP-4100, ADEKA RESIN EP-4100G, ADEKA RESIN EP-4100E, ADEKA RESIN EP-4100L, ADEKA RESIN EP-4100TX, ADEKA RESIN EP-4000, ADEKA RESIN EP-4005, ADEKA RESIN EP-4080E, ADEKA RESIN EP-4082HT, ADEKA RESIN EP-4901, ADEKA RESIN EP-4901E, ADEKA GLYCIROL ED-501, ADEKA GLYCIROL ED-509E, ADEKA GLYCIROL ED-509S, and ADEKA GLYCIROL ED-529 (manufactured by ADEKA Corporation)); EXA-4816 (manufactured by DIC Corporation) and EXA-4822 (manufactured by DIC Corporation), which are polyalkylene-oxidized bisphenol A type epoxy resins; R-1710 (manufactured by Mitsui Chemicals, Inc.), which is a bisphenol AD type epoxy resin; N-7305 (manufactured by DIC Corporation) and Quatrex-2010 (manufactured by The Dow Chemical Company), which are phenol novolac type epoxy resins; YDCN-7025 (manufactured by NIPPON STEEL Epoxy Manufacturing Co., Ltd.) and EOCN-100 (manufactured by Nippon Kayaku Co., Ltd.), which are cresol novolac type epoxy resins; EPPN-501 (manufactured by Nippon Kayaku Co., Ltd.), TACTIX-742 (manufactured by The Dow Chemical Company), VG-3010 (manufactured by Mitsui Chemicals, Inc.), 1032S (manufactured by Mitsubishi Chemical Corporation), and 1032-H60 (manufactured by Mitsubishi Chemical Corporation), which are multifunctional epoxy resins; HP-4032 (manufactured by DIC Corporation), which is an epoxy resin having a naphthalene skeleton; EHPE-3150 and CEL-3000 (manufactured by Daicel Corporation), DME-100 (manufactured by New Japan Chemical Co., Ltd.), and EX-216L (manufactured by Nagase Chemtex Corporation), which are alicyclic epoxy resins; W-100 (manufactured by New Japan Chemical Co., Ltd.), which is an aliphatic epoxy resin; ELM-100 (manufactured by Sumitomo Chemical Industry Company Limited), YH-434L (manufactured by NIPPON STEEL Epoxy Manufacturing Co., Ltd.), TETRAD-X and TETRAD-C (manufactured by MITSUBISHI GAS CHEMICAL COMPANY, INC.), and 630 and 630LSD (manufactured by Mitsubishi Chemical Corporation), which are amine type epoxy resins; DENACOL EX-201 (manufactured by Nagase Chemtex Corporation), which is a resorcin type epoxy resin; DENACOL EX-211 (manufactured by Nagase Chemtex Corporation), which is a neopentyl glycol type epoxy resin; DENACOL EX-212 (manufactured by Nagase Chemtex Corporation), which is a hexanedienyl glycol type epoxy resin; DENACOL EX series (EX-810, 811, 850, 851, 821, 830, 832, 841, and 861 (manufactured by Nagase Chemtex Corporation)), which are ethylene/propylene glycol type epoxy resins; and EXA-4850-1000 (manufactured by DIC Corporation) and EXA-4850-150 (manufactured by DIC Corporation), which are vinyl ether type epoxy resins. Among these epoxy resins, an epoxy resin having a glycidyl group is preferably used.

The content of the component (D) in the resin composition is preferably 1 to 30 parts by mass based on 100 parts by mass of the total amount of the components (A) to (C). The content of the component (D) in the resin composition is more preferably 3 to 20 parts by mass, and particularly preferably 5 to 15 parts by mass, based on 100 parts by mass of the total amount of the components (A) to (C) because the electric conductivity of a resultant cured product is enhanced more. When the content of the component (D) is less than 1 part by mass based on 100 parts by mass of the total amount of the components (A) to (C), an effect to be brought about by allowing the resin composition to contain the component (D) is unlikely to be exhibited. On the other hand, even when the content of the component (D) is set in such a way as to exceed 30 parts by mass based on 100 parts by mass of the total amount of the components (A) to (C), the effect to be brought about by allowing the resin composition to contain the component (D) is difficult to enhance.

Next, a method for forming a cured product, which is one embodiment of the present invention, will be described. The method for forming a cured product of the present embodiment includes: an application step of applying the above-mentioned resin composition on a substrate; and a curing step of curing the resin composition by heating the substrate on which the resin composition has been applied. In the curing step, the substrate on which the resin composition has been applied is preferably heated at 50 to 250° C. because a cured product having more satisfactory electric conductivity can be obtained, and the substrate is more preferably heated at 100 to 200° C. Further, in the curing step, the substrate on which the resin composition has been applied is preferably heated for 1 to 200 minutes and is more preferably heated for 10 to 60 minutes. Note that, if necessary, the curing step may further include, prior to the curing step, a drying step of retaining the substrate or the substrate on which the resin composition has been applied at 50 to 150° C. to volatilize a low-boiling-point component, such as an organic solvent.

Examples of the method of applying the resin composition on the substrate (application method) in the application step include a spin coating method, a dipping method, a spray coating method, a mist coating method, a flow coating method, a curtain coating method, a roll coating method, a knife coating method, a bar coating method, a slit coating method, a screen printing method, a gravure printing method, an offset printing method, an inkjet method, and brush application.

The application step to the arbitrary step can be repeated plural times in order to obtain a film thickness required in a cured film to be formed. For example, all the steps from the application step to the curing step may be repeated plural times, or the application step and the drying step may be repeated plural times.

By curing the resin composition, a cured product which is one embodiment of the present invention can be obtained. Examples of the application of the cured product of the present embodiment include an electrically conductive layer, an electrode film, and wiring.

EXAMPLES

Hereinafter, the present invention will be described in more detail with Examples and Comparative Examples. However, the present invention is not limited at all by the following Examples and the like.

<Component (A)>

A-1 and A-2, which are described below, were each prepared as the component (A) (copper particles).

A-1: Granular copper particles ($D_{50}$: 3.5 μm, trade name "1300Y," manufactured by MITSUI MINING & SMELTING CO., LTD.)

A-2: Flake-like copper particles ($D_{50}$: 3.1 μm, trade name "1200YP," manufactured by MITSUI MINING & SMELTING CO., LTD.)

<Component (B)>

B-1 and B-2, which are described below, were each prepared as the component (B) (phosphoric acid-modified epoxy resin).

B-1: Trade name "EP-49-10P" manufactured by ADEKA Corporation (a compound obtained by reacting trade name "ADEKA RESIN EP-4100E" (bisphenol A type epoxy resin, epoxy equivalent: 190 g/eq., manufactured by ADEKA Corporation) with phosphoric acid at 60 to 70° C.; amount of epoxy resin modified with phosphoric acid 1.0% by mass)

B-2: Trade name "EP-49-10P2" manufactured by ADEKA Corporation (a compound obtained by reacting trade name "ADEKA RESIN EP-4100E" (bisphenol A type epoxy resin, epoxy equivalent: 190 g/eq., manufactured by ADEKA Corporation) with phosphoric acid at 60 to 70° C.; amount of epoxy resin modified with phosphoric acid 1.5% by mass)

<Component (C)>

C-1, which is described below, was prepared as the component (C) (curing agent).

C-1: Imidazole compound (trade name "2E4MZ," manufactured by SHIKOKU CHEMICALS CORPORATION)

<Component (D)>

D-1 to D-4, which are described below, were each prepared as the component (D) (resin).

D-1: Xylene resin (trade name "PR-1440," manufactured by Fudow Company Limited)

D-2: Phenol resin (trade name "PL-2211," manufactured by Gun Ei Chemical Industry Co., Ltd.)

D-3: Epoxy resin (trade name "ED-509S," manufactured by ADEKA Corporation)

D-4: Epoxy resin (trade name "EP-4100," manufactured by ADEKA Corporation)

<Resin Composition>

Examples 1 to 7 and Comparative Examples 1 to 4

Respective components were mixed in such a way as to make a composition shown in Table 1 to produce example resin compositions Nos. 1 to 7 and comparative example resin compositions 1 to 4.

TABLE 1

| | Resin composition | Component (A)-1 parts by mass | Component (A)-2 parts by mass | Component (B) parts by mass | Component (C) parts by mass | Component (D)-1 parts by mass | Component (D)-2 parts by mass |
|---|---|---|---|---|---|---|---|
| Example 1 | Example resin composition No. 1 | A-1 65 | A-2 15 | B-1 5 | C-1 2 | D-1 5 | — — |
| Example 2 | Example resin composition No. 2 | A-1 80 | — — | B-1 5 | C-1 1 | D-2 5 | — — |
| Example 3 | Example resin composition No. 3 | A-1 85 | — — | B-1 10 | C-1 1 | D-3 5 | — — |
| Example 4 | Example resin composition No. 4 | A-1 80 | A-2 5 | B-1 10 | C-1 1 | D-3 5 | — — |
| Example 5 | Example | A-1 | — | B-2 | C-1 | D-3 | — |

TABLE 1-continued

| | Resin composition | Component (A)-1 parts by mass | Component (A)-2 parts by mass | Component (B) parts by mass | Component (C) parts by mass | Component (D)-1 parts by mass | Component (D)-2 parts by mass |
|---|---|---|---|---|---|---|---|
| | resin composition No. 5 | 85 | — | 10 | 1 | 5 | — |
| Example 6 | Example resin composition No. 6 | A-1 80 | A-2 5 | B-2 5 | C-1 1 | D-1 5 | D-2 5 |
| Example 7 | Example resin composition No. 7 | A-1 70 | — | B-1 5 | C-1 1 | — | — |
| Comparative Example 1 | Comparative example resin composition 1 | A-1 70 | A-2 10 | — | C-1 1 | D-1 5 | — |
| Comparative Example 2 | Comparative example resin composition 2 | A-1 80 | — | — | C-1 2 | D-2 10 | — |
| Comparative Example 3 | Comparative example resin composition 3 | A-1 85 | — | — | C-1 2 | D-1 5 | D-3 10 |
| Comparative Example 4 | Comparative example resin composition 4 | A-1 80 | A-2 5 | — | C-1 1 | D-3 5 | D-4 10 |

<Production of Cured Product>

Each of example resin compositions Nos. 1 to 7 and comparative example resin compositions 1 to 4 was applied on a glass substrate by a bar coater method in such a way as to make the thickness 30 μm. The applied resin composition was heated and baked in the air atmosphere at 150° C. for 30 minutes, and thus example cured products Nos. 1 to 7 and comparative example cured products 1 to 4, which were in the form of thin film, were obtained.

<Evaluation of Volume Resistance Value>

Evaluation Examples 1 to 7 and Comparative Evaluation Examples 1 to 4

The volume resistance values of example cured products No. 1 to 7 and comparative example cured products 1 to 4 were measured by a four-point probe method using a high-precision resistivity meter (product name "Loresta GP," manufactured by Nittoseiko Analytech Co., Ltd.). Results are shown in Table 2.

TABLE 2

| | Cured product | Volume resistance value (Ω · cm) |
|---|---|---|
| Evaluation Example 1 | Example cured product No. 1 | $5.2 \times 10^{-4}$ |
| Evaluation Example 2 | Example cured product No. 2 | $1.5 \times 10^{-3}$ |
| Evaluation Example 3 | Example cured product No. 3 | $1.1 \times 10^{-3}$ |
| Evaluation Example 4 | Example cured product No. 4 | $6.7 \times 10^{-4}$ |
| Evaluation Example 5 | Example cured product No. 5 | $2.9 \times 10^{-3}$ |
| Evaluation Example 6 | Example cured product No. 6 | $6.1 \times 10^{-4}$ |
| Evaluation Example 7 | Example cured product No. 7 | $5.1 \times 10^{-3}$ |
| Comparative Evaluation Example 1 | Comparative example cured product 1 | $3.6 \times 10^{-2}$ |
| Comparative Evaluation Example 2 | Comparative example cured product 2 | $6.8 \times 10^{-2}$ |
| Comparative Evaluation Example 3 | Comparative example cured product 3 | $5.5 \times 10^{-2}$ |
| Comparative Evaluation Example 4 | Comparative example cured product 4 | O.L.* |

*O.L.: Overload (unmeasurable)

As shown in Table 2, it is understood that the volume resistance values in Evaluation Examples 1 to 7 are lower than the volume resistance values in Comparative Evaluation Examples 1 to 4, that is, example cured products Nos. 1 to 7 are superior to comparative example cured products 1 to 4 in electric conductivity. Among Evaluation Examples 1 to 7, the volume resistance values in Evaluation Examples 1 to 6 are further lower, and the volume resistance values in Evaluation Examples 1, 4, and 6 are particularly lower. From the above results, it is understood that by: (i) allowing the resin composition to further contain the component (D) in addition to the components (A) to (C); and (ii) allowing the resin composition to contain both of granular copper particles and flake-like copper particles as the component (A), the electric conductivity of a resultant cured product is particularly enhanced. From those described above, it is clear that a cured product obtained by curing the resin composition of the present embodiment is a cured product having excellent electric conductivity.

The invention claimed is:

1. A resin composition comprising:
   (A) copper particles having an average particle diameter in a range from 0.1 to 20 μm;
   (B) phosphoric acid-modified epoxy resin obtained by reacting phosphoric acid (b1) with an epoxy compound (b2);
   (C) a curing agent; and
   (D) xylene resin, resol type phenol resin, or a combination thereof, excluding the component (B),
   wherein a content of the component (B), a content of the component (C), and a content of the component (D), each relative to a total amount of the components (A), (B), and (C) as 100 parts by mass, are in a range from 0.1 to 30 parts by mass, in a range from 0.1 to 5 parts by mass, and in a range from 1 to 30 parts by mass, respectively, and wherein a volume resistance value of a cured product of the composition does not exceed $1.5 \times 10^{-3}$ (Ω·cm), where the volume resistance value of the cured product is measured by coating a glass substrate with the composition so as to have a thickness of 30 μm, heating the coating at temperature of 150° C. for 30 minutes, and measuring the volume resistance value of the heated coating by a four-point probe method.

2. A method for forming a cured product, comprising:
   applying the resin composition according to claim 1 on a substrate; and
   curing the resin composition by heating the substrate on which the resin composition has been applied.

3. The method for forming a cured product according to claim 2, wherein the substrate on which the resin composition has been applied is heated at a temperature in a range from 50 to 250° C. for a period in a range from 1 to 200 minutes.

4. A cured product obtained by curing the resin composition according to claim 1.

5. The resin composition according to claim 1, wherein the component (D) is the xylene resin.

6. The resin composition according to claim 5, wherein the xylene resin is resol type xylene resin.

7. The resin composition according to claim 1, wherein the component (D) is the resol type phenol resin.

8. The resin composition according to claim 1, wherein the component (D) is the combination of the xylene resin and the resol type phenol resin.

9. The resin composition according to claim 1, wherein a phenolic compound present in the resin composition, other than the component (B), consists of the resol type phenol resin in the component (D) if the component (D) is the resol type phenol resin or the combination.

* * * * *